United States Patent
Amemiya (10) Patent No.: US 6,705,997 B2
(45) Date of Patent: Mar. 16, 2004

(54) SIGNAL PROCESSING CIRCUIT AND ULTRASOUND DOPPLER APPARATUS

(75) Inventor: Shinichi Amemiya, Tokyo (JP)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 60 days.

(21) Appl. No.: 10/092,680

(22) Filed: Mar. 14, 2002

(65) Prior Publication Data

US 2002/0133076 A1 Sep. 19, 2002

(30) Foreign Application Priority Data

Mar. 15, 2001 (JP) .......................................... 2001-73896

(51) Int. Cl.⁷ ................................................ A61B 8/06
(52) U.S. Cl. ..................................................... 600/467
(58) Field of Search ................................ 600/437, 443, 600/447; 327/261, 271, 283–284; 73/625–626; 365/45, 78; 367/103–105, 7, 11

(56) References Cited

U.S. PATENT DOCUMENTS

| | | | |
|---|---|---|---|
| 3,676,839 A | * 7/1972 | Wohl et al. | .................. 367/103 |
| 4,481,823 A | * 11/1984 | Alais | ........................... 73/626 |
| 4,603,586 A | * 8/1986 | Iida | .............................. 73/626 |
| 4,873,869 A | 10/1989 | Fink | |
| 5,027,821 A | * 7/1991 | Hirama et al. | .............. 600/447 |
| 5,140,558 A | * 8/1992 | Harrison, Jr. et al. | ........... 367/7 |
| 5,146,192 A | * 9/1992 | Kondo et al. | ................ 333/164 |
| 5,187,687 A | 2/1993 | Burckhardt et al. | |
| 5,231,573 A | 7/1993 | Takamizawa | |
| 5,261,281 A | 11/1993 | Katakura et al. | |
| 5,269,307 A | * 12/1993 | Fife et al. | ..................... 73/625 |
| 5,299,576 A | 4/1994 | Shiba | |
| 5,349,960 A | 9/1994 | Gondo | |
| 5,375,470 A | * 12/1994 | Matsushima et al. | ......... 73/626 |
| 5,477,479 A | 12/1995 | Ochi | |
| 5,515,727 A | 5/1996 | Miwa et al. | |
| 5,520,186 A | * 5/1996 | Deitrich | ...................... 600/447 |
| 5,573,001 A | * 11/1996 | Petrofsky et al. | ........... 600/447 |
| 5,591,911 A | 1/1997 | Masuzawa et al. | |
| 5,655,536 A | 8/1997 | Takamizawa | |
| 6,108,439 A | 8/2000 | Ishiguro | |
| 6,298,269 B1 | 10/2001 | Sweeney | |

* cited by examiner

Primary Examiner—Francis J. Jaworski
(74) Attorney, Agent, or Firm—Carl B. Horton, Esq.; Armstrong Teasdale LLP (57) ABSTRACT

In order to arrange continuous wave signal paths using fewer switches, a plurality of amplifying circuits 602 for respectively amplifying a plurality of continuous wave input signals, and outputting each respective pair of amplified signals that have mutually opposite phases for each continuous wave input signal; a plurality of selecting circuits 604, each of which selects one signal of the pair of amplified signals from each of the plurality of amplifying circuits; and a matrix switch 608 employing the output signals from the plurality of selecting circuits as input signals are provided.

31 Claims, 7 Drawing Sheets

SIGNAL PROCESSING CIRCUIT AND ULTRASOUND DOPPLER APPARATUS

CROSS REFERENCE TO RELATED APPLICATIONS

This application claims the benefit of Japanese Application No. 2001-73896 filed Mar. 15, 2001.

BACKGROUND OF THE INVENTION

The present invention relates to a signal processing circuit and an ultrasound Doppler apparatus, and particularly to a signal processing circuit for processing a plurality of continuous wave (CW) signals, and an ultrasound Doppler apparatus for performing diagnosis by a CW Doppler method.

In performing ultrasonic diagnosis by a CW Doppler method, a Doppler shift of an echo of continuous wave ultrasound is calculated, and the calculated Doppler shift is displayed as a frequency spectral image or a sound. The frequency spectral image or sound is information representing the velocity of blood flow, etc.

When the direction of echo reception is electronically set by a phased array technique, a phased addition is performed on echoes received by a plurality of ultrasonic transducers in an ultrasonic probe.

The phased addition of the received echo signals is performed using an analog delay line. The analog delay line has a plurality of input taps provided at different positions in the longitudinal direction of the signal delay line, and an output tap provided at an end of the signal delay line. A signal input to one of the input taps is output from the output tap with a delay imparted depending upon the tap position. The maximum delay by the signal delay line is equal to one wavelength of the input signal.

By inputting a plurality of input signals to respective proper input taps depending upon the phase differences among the input signals, all the signals can be put in phase at the output tap. At the output tap, all the in-phase signals are superposed to provide a phased added signal of all the input signals.

To enable switching of the reception direction, the individual received echo signals are allowed to be input to arbitrarily selected input taps. As means for this, a matrix switch is employed. The matrix switch comprises a plurality of row signal lines and a plurality of column signal lines mutually insulated and disposed in a grid, and switches at the intersections of the row signal lines and column signal lines.

Since a row signal line and a column signal line are electrically connected at a closed switch, the switches can be selectively closed to connect arbitrarily selected row signal lines to arbitrarily selected column signal lines.

In such a matrix switch, arbitrarily selected received echo signals can be input to arbitrarily selected input taps of the analog delay line by inputting the plurality of received echo signals to either of the row signal lines or the column signal lines, connecting the other lines (i.e., column signal lines or row signal lines) to the input taps of the analog delay line and controlling opening/closing of the switches. In other words, the matrix switch serves as an arranger of the signal paths for inputting received echo signals to the analog delay line.

The number of switches in the matrix switch is the product of the number of received echo signals to be subjected to the phased addition and the number of the input taps of the analog delay line. The number of received echo signals is equal to the number of echo reception channels.

The number of echo reception channels has increased with miniaturization of the ultrasonic transducers, recently reaching the order of 48 channels, for example. The number of input taps of the analog delay line is of the order of 8 or 16. Hence, the matrix switch is required to have 384 or 768 switches, inevitably leading to scaling up.

SUMMARY OF THE INVENTION

It is therefore an object of the present invention to provide a signal processing circuit and an ultrasonic Doppler apparatus that can arrange continuous wave signal paths using fewer switches. Moreover, it is another object to provide a signal processing circuit and an ultrasonic Doppler apparatus that are adaptive to the frequency change of the continuous wave signals.

(1) The present invention, in accordance with one aspect thereof for solving the aforementioned problem, is a signal processing circuit comprising: a plurality of amplifying circuits for respectively amplifying a plurality of continuous wave input signals, and outputting each respective pair of amplified signals that have mutually opposite phases for each continuous wave input signal; a plurality of selecting circuits, each of which selects one signal of the pair of amplified signals from each of the plurality of amplifying circuits; and a matrix switch having a plurality of mutually crossing signal input paths and signal output paths, and switches provided one at every intersection of the signal input paths and signal output paths, in which the output signals from the plurality of selecting circuits are led respectively to the plurality of signal input paths.

In the invention as described in (1), since each of the plurality of amplifying circuits for respectively amplifying a plurality of continuous wave input signals outputs a pair of amplified signals that have mutually opposite phases for each input signal, a pair of amplified signals that are given a delay of substantially a half wavelength relative to each other can be obtained for each input signal.

Therefore, a delay circuit for performing a phased addition on a plurality of input signals may have a maximum delay of a half wavelength, and hence the number of input taps of the delay circuit is reduced by half. Accordingly, the number of switches in the matrix switch can be reduced by half.

In the invention as described in (1), the signal processing circuit preferably comprises voltage/current transforming circuits provided between the plurality of amplifying circuits and the plurality of selecting circuits, one voltage/current transforming circuit being provided for each of the output paths for each pair of amplified signals from the plurality of amplifying circuits, which is advantageous because the input signals for the selecting circuits can be current signals.

In the invention as described in (1), the signal processing circuit preferably comprises voltage/current transforming circuits provided between the plurality of selecting circuits and the matrix switch, one voltage/current transforming circuit being provided for each of the plurality of selecting circuits, which is advantageous because the input signals for the matrix switch can be current signals.

The voltage/current transforming circuit is preferably a resistor, which is advantageous because the configuration can be simplified.

In the invention as described in (1), the signal processing circuit preferably comprises a control circuit for controlling the selecting circuits and the switches in the matrix switch, which is advantageous because the connection relationship between the signal input paths and the signal output paths can be appropriately recombined.

In the invention as described in (1), the signal processing circuit preferably comprises a signal delay circuit having a plurality of signal input taps drawn out from different positions along a signal delay line and a signal output tap drawn out from at least one end of the signal delay line, in which the signals from the plurality of signal output paths of the matrix switch are led respectively to the plurality of signal input taps, which is advantageous because a phased addition can be suitably performed on a plurality of input signals.

The signal delay circuit preferably has at least two switchable delay characteristics, which is advantageous because the circuit can be adapted to the frequency change of the input signals.

The signal delay circuit preferably comprises matching resistors connected respectively to both ends of the signal delay line; a series circuit of a switch and a resistor connected in parallel to each of the matching resistors; and a series circuit of a capacitor and a switch provided between each end of the signal delay line and ground and between each of the drawn-out positions of the plurality of signal input taps and ground, which is advantageous because the circuit can be made adaptable to the frequency change of the input signals.

The signal processing circuit preferably comprises a control circuit for controlling the switches, which is advantageous because the circuit can be adapted to the frequency change of the input signals.

The signal processing circuit preferably comprises buffer amplifying circuits provided between the matrix switch and the signal delay circuit, one buffer amplifying circuit being provided for each of the plurality of signal output paths, which is advantageous because the signal output paths and the signal delay circuit can be prevented from being affected by each other's internal impedance.

The buffer amplifying circuit is preferably a grounded-base type transistor circuit, which is advantageous because the configuration can be simplified.

(2) The present invention, in accordance with another aspect thereof for solving the aforementioned problem, is a signal processing circuit comprising: a signal delay line; matching resistors connected respectively to both ends of the signal delay line; a plurality of signal input taps drawn out from different positions along the signal delay line; a signal output tap drawn out from at least one end of the signal delay line; a series circuit of a switch and a resistor connected in parallel to each of the matching resistors; and a series circuit of a capacitor and a switch provided between each end of the signal delay line and ground and between each of the drawn-out positions of the plurality of signal input taps and ground.

In the invention as described in (2), since a series circuit of a switch and a resistor connected in parallel to each matching resistor, and a series circuit of a capacitor and a switch provided between each end of the signal delay line and ground and between each of the drawn-out positions of the plurality of signal input taps and ground are provided, the signal delay circuit can be adapted to a plurality of kinds of frequencies by opening/closing the switches.

In the invention as described in (2), the signal processing circuit preferably comprises a control circuit for controlling the switches, which is advantageous because the signal delay circuit can be adapted to a plurality of kinds of frequencies.

(3) The present invention, in accordance with still another aspect thereof for solving the aforementioned problem, is an ultrasound Doppler apparatus comprising: ultrasound transmitting/receiving means for transmitting continuous wave ultrasound and receiving echoes of the continuous wave ultrasound by a plurality of ultrasonic transducers; a plurality of amplifying means for respectively amplifying a plurality of continuous wave input signals led from the plurality of ultrasonic transducers, and outputting each respective pair of amplified signals that have mutually opposite phases for each continuous wave input signal; a plurality of selecting means, each of which selects one signal of the pair of amplified signals from each of the plurality of amplifying means; signal path arranging means having a plurality of mutually crossing signal input paths and signal output paths, and switches provided one at every intersection of the signal input paths and signal output paths, in which the output signals from the plurality of selecting means are led respectively to the plurality of signal input paths; signal delay means having a plurality of signal input taps drawn out from different positions along a signal delay line and a signal output tap drawn out from at least one end of the signal delay line, in which the signals from the plurality of signal output paths of the signal path arranging means are led respectively to the plurality of signal input taps; control means for controlling the selecting means and the switches in the signal path arranging means; Doppler processing means for calculating a Doppler shift of the echoes based on the signal led from the signal output tap of the signal delay means; and display means for displaying the calculated Doppler shift.

In the invention as described in (3), since each of the plurality of amplifying means for respectively amplifying a plurality of continuous wave input signals outputs a pair of amplified signals that have mutually opposite phases for each input signal, a pair of amplified signals that are given a delay of substantially a half wavelength relative to each other can be obtained for each input signal.

Therefore, delay means for performing a phased addition on a plurality of input signals may have a maximum delay of a half wavelength, and hence the number of input taps of the delay means is reduced by half. Accordingly, the number of switches in the signal path arranging means can be reduced by half.

In the invention as described in (3), the ultrasound Doppler apparatus preferably comprises voltage/current transforming means provided between the plurality of amplifying means and the plurality of selecting means, one voltage/current transforming means being provided for each of the output paths for each pair of amplified signals from the plurality of amplifying means, which is advantageous because the input signals for the selecting means can be current signals.

In the invention as described in (3), the ultrasound Doppler apparatus preferably comprises voltage/current transforming means provided between the plurality of selecting means and the signal path arranging means, one voltage/current transforming means being provided for each of the plurality of selecting means, which is advantageous because the input signals for the signal path arranging means can be current signals.

The voltage/current transforming means is preferably a resistor, which is advantageous because the configuration can be simplified.

In the invention as described in (3), the ultrasound Doppler apparatus preferably comprises buffer amplifying means provided between the signal path arranging means and the signal delay means, one buffer amplifying means being provided for each of the plurality of signal output paths, which is advantageous because the signal output paths and the signal delay means can be prevented from being affected by each other's internal impedance.

The buffer amplifying means is preferably a grounded-base type transistor circuit, which is advantageous because the configuration can be simplified.

In the invention as described in (3), the signal path arranging means is preferably a matrix switch, which is advantageous because a general-purpose semiconductor integrated circuit can be used.

In the invention as described in (3), the signal delay means preferably has at least two switchable delay characteristics, which is advantageous because the apparatus can be adapted to the frequency change of the input signals.

The signal delay means preferably comprises matching resistors connected respectively to both ends of the signal delay line; a series circuit of a switch and a resistor connected in parallel to each of the matching resistors; a series circuit of a capacitor and a switch provided between each end of the signal delay line and ground and between each of the drawn-out positions of the plurality of signal input taps and ground; and control means for controlling the switches, which is advantageous because the apparatus can be adapted to the frequency change of the input signals.

As described above in detail, the present invention can provide a signal processing circuit and an ultrasonic Doppler apparatus that can arrange continuous wave signal paths using fewer switches. Moreover, the present invention can also provide a signal processing circuit and an ultrasonic Doppler apparatus that are adaptive to the frequency change of the continuous wave signals.

Further objects and advantages of the present invention will be apparent from the following description of the exemplary embodiments of the invention as illustrated in the accompanying drawings.

DETAILED DESCRIPTION OF THE INVENTION

Figure 1:
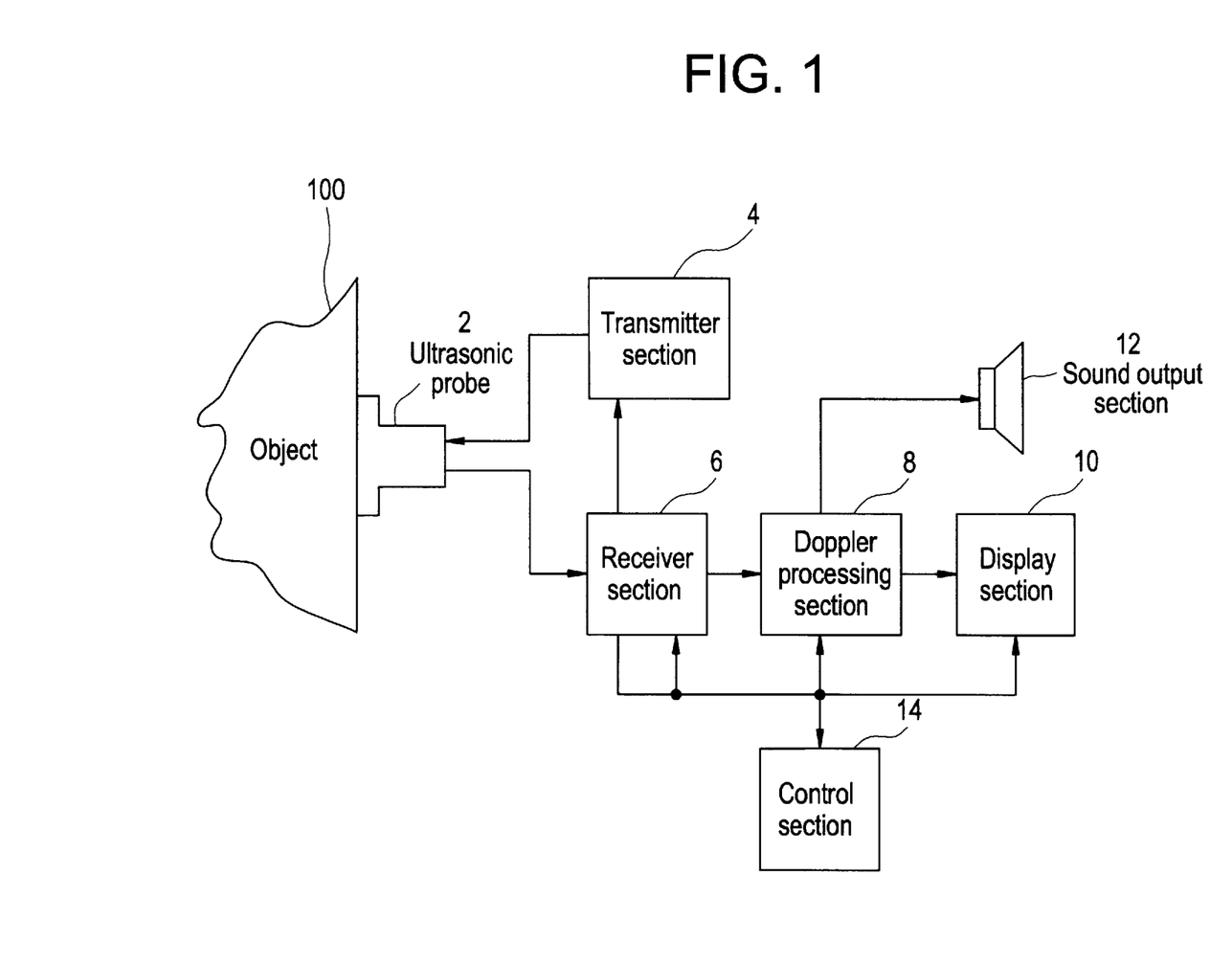
FIG. 1 is a block diagram of an apparatus in accordance with one embodiment of the present invention.

Embodiments of the present invention will now be described in detail with reference to the accompanying drawings. It should be noted that the present invention is not limited to the embodiments. FIG. 1 shows a block diagram of an ultrasound Doppler apparatus, which is an embodiment of the present invention. The configuration of the apparatus represents one embodiment of the apparatus of the present invention.

As shown in FIG. 1, the apparatus has an ultrasonic probe 2. The ultrasonic probe 2 has an array of a plurality of ultrasonic transducers, which is not shown. The individual ultrasonic transducers are made from a piezoelectric material such as PZT (lead zirconate (Zr) titanate (Ti)) ceramic. The ultrasonic probe 2 is used by a user abutting the probe 2 against an object 100.

The ultrasonic probe 2 is connected with a transmitter section 4 and a receiver section 6. The transmitter section 4 provides a driving signal to the ultrasonic probe 2 to transmit ultrasound. The driving signal is a continuous wave signal of a predetermined frequency. Continuous wave ultrasound is thus transmitted.

An echo of the transmitted continuous wave ultrasound is received by the ultrasonic probe 2. A portion including the ultrasonic probe 2 and the transmitter section 4 is an embodiment of the ultrasound transmitting/receiving means of the present invention.

The receiver section 6 is supplied with individual signals received by the ultrasonic transducers in the ultrasonic probe 2. In other words, multi-channel echo received wave signals are individually input. The echo received wave signals are continuous wave signals, which will be sometimes referred to as CW signals hereinbelow.

The receiver section 6 forms a received echo signal in a certain direction by performing a phased addition on the multi-channel continuous wave echo received wave signals. A portion consisting of the receiver section 6 and a control section 14 that will be described later is an embodiment of the signal processing circuit of the present invention. The configuration of the portion consisting of the receiver section 6 and the control section 14 represents an embodiment of the circuit of the present invention.

Figure 2:
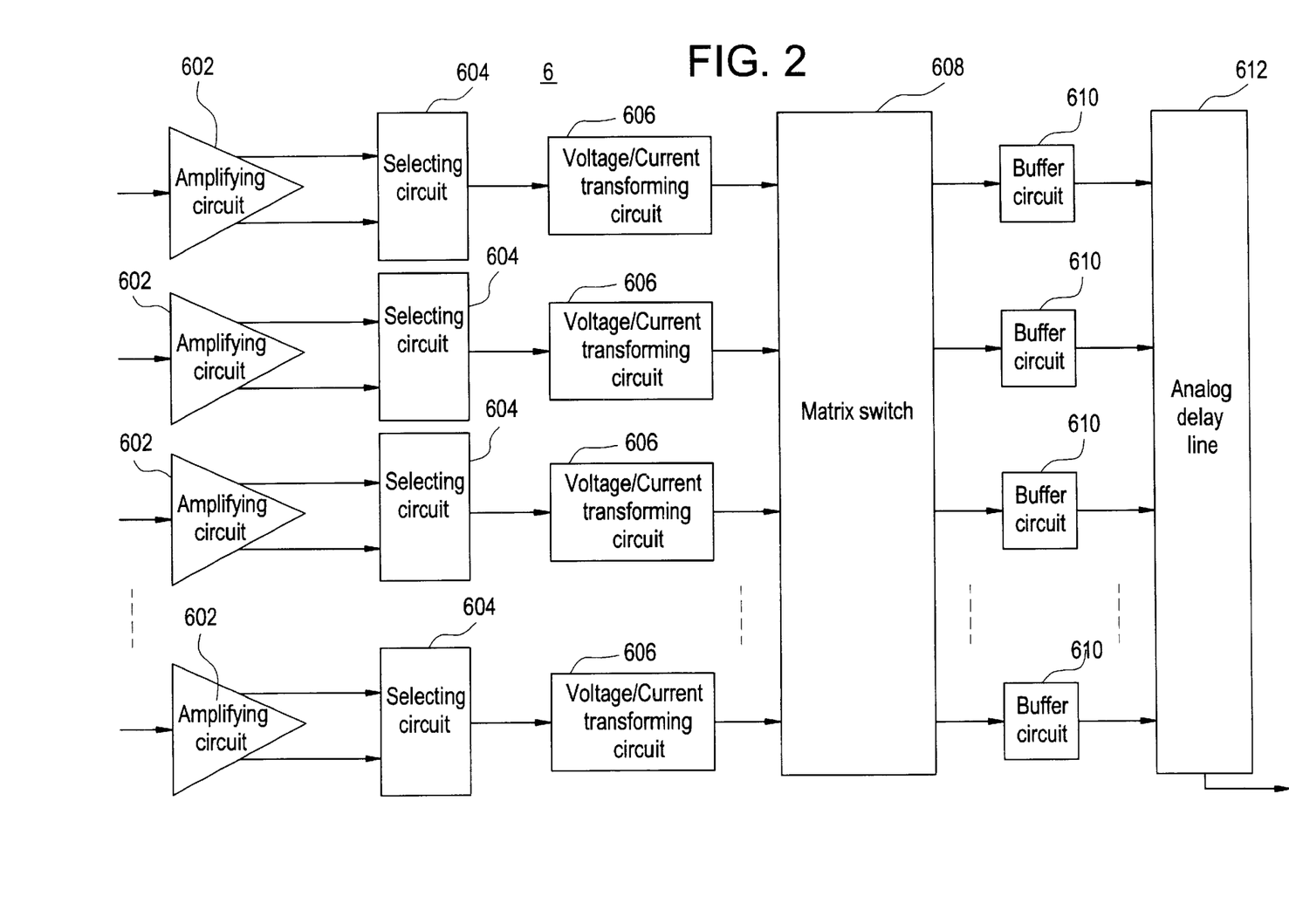
FIG. 2 is a block diagram of a receiver section.

FIG. 2 shows a block diagram of the receiver section 6. As shown, the receiver section 6 has a plurality of amplifying circuits 602. The number of the amplifying circuits 602 is equal to the number of channels for the echo received wave signals, and is 48, for example. The amplifying circuit 602 is an embodiment of the amplifying circuit of the present invention. It is also an embodiment of the amplifying means of the present invention.

Each amplifying circuit 602 simultaneously generates two output signals that have mutually opposite phases. Thus, if one of the two output signals is in the same phase as that of the input signal, for example, then the other is in the opposite phase.

As for the CW signals, a signal of opposite phase can be regarded as a signal delayed by a half wavelength. Therefore, each amplifying circuit 602 simultaneously outputs an undelayed amplified signal and a substantially half-wavelength delayed amplified signal for each input signal.

The two output signals from the amplifying circuit 602 are input to a selecting circuit 604. The selecting circuit 604 is an embodiment of the selecting circuit of the present invention. It is also an embodiment of the selecting means of the present invention. A number of the selecting circuits 604 are provided corresponding to the amplifying circuits 602, and are supplied with the output signals from the corresponding amplifying circuits 602.

Each selecting circuit 604 selects one of the two input signals under control of the control section 14 that will be described later. When the selecting circuit 604 selects a signal of opposite phase, it means,that a signal delayed by substantially a half wavelength is selected. The wavelength of the input signal is represented by $\lambda$ and the half wavelength by $\lambda/2$ hereinbelow.

The output signal from each selecting circuit 604 is input to a voltage/current transforming circuit 606. The voltage/ current transforming circuit 606 is an embodiment of the voltage/current transforming circuit of the present invention. It is also an embodiment of the voltage/current transforming means of the present invention.

A number of the voltage/current transforming circuits 606 are provided in association with the selecting circuits 604, and are supplied with the output signals from the corresponding selecting circuits 604. The voltage/current transforming circuits 606 may be provided on the input side of the selecting circuits 604, one for one of two outputs of each amplifying circuit 602.

Figure 3A:
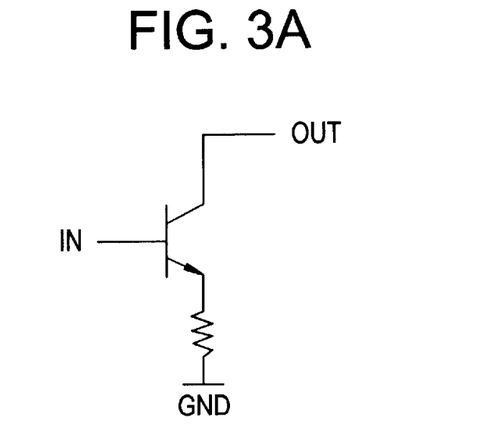
FIG. 3 is a circuit diagram of a voltage/current transforming circuit.
Figure 3B:
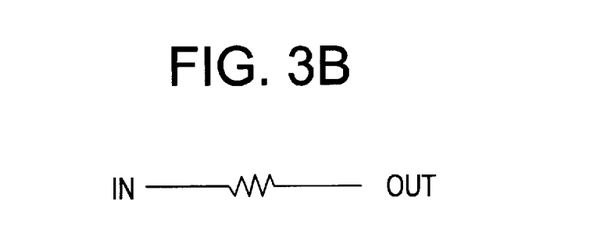

For each voltage/current transforming circuit 606, a transistor circuit as exemplarily shown in FIG. 3(a) is employed. A voltage input to the base of the transistor is transformed into a current determined by the value of a resistor connected in series to the emitter, and output from the collector. The voltage/current transforming circuit 606 may also be a simple resistor as shown in FIG. 3(b). The input voltage is transformed into a current determined by the value of the resistor.

Output signals from the plurality of the voltage/current transforming circuits 606 are input to a matrix switch 608. A matrix switch constructed in, for example, a semiconductor integrated circuit, is employed as the matrix switch 608. The matrix switch is sometimes referred to as a crosspoint switch. The matrix switch 608 is an embodiment of the matrix switch of the present invention. It is also an embodiment of the signal path arranging means of the present invention.

Figure 4:
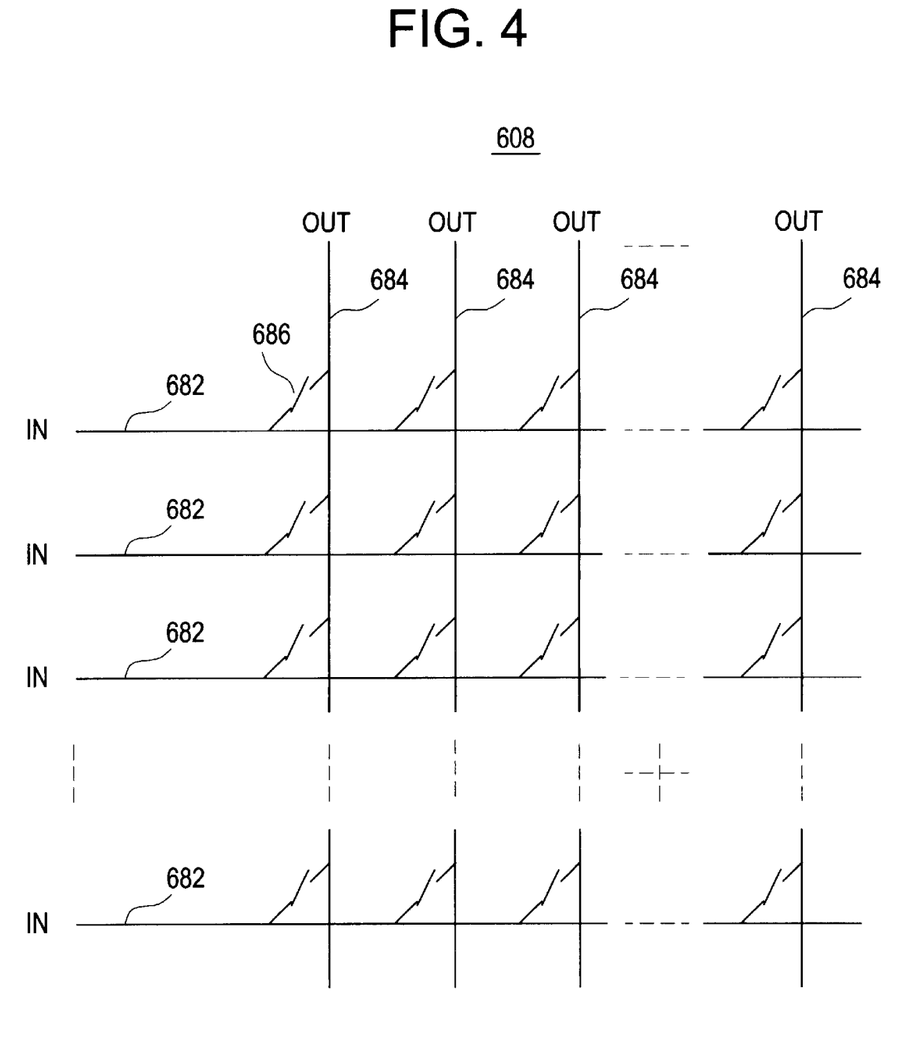
FIG. 4 is a conceptual diagram of a matrix switch.

FIG. 4 shows a conceptual diagram of the matrix switch 608. As shown, the matrix switch 608 has a plurality of row signal lines 682 and a plurality of column signal lines 684. The row signal lines 682 and the column signal lines 684 mutually intersect to form a grid. The intersections of the lines 682 and 684 are electrically insulated. Each of the intersections is provided with a switch 686 between a row signal line 682 and a column signal line 684. The number designation of the switches is represented by that at one position.

By closing the switch 686, the row signal line 682 and the column signal line 684 are electrically connected. By selecting the switches 686 to be closed, arbitrarily selected row signal lines 682 can be connected to arbitrarily selected column signal lines 684. The opening/closing of the switches 686 is controlled by the control section 14 that will be described later.

The row signal lines 682 are used as input signal lines, for example. The column signal lines 684 are used as output signal lines, for example. The input/output relationship may be inverted. The input signal lines, or the row signal lines 682, are respectively supplied with the output signals from the voltage/current transforming circuits 606. The number of the row signal lines 682 is equal to the number of the voltage/current transforming circuit 606, and is 48, for example.

The output signal lines, or the column signal lines 684, are connected to a plurality of input taps of an analog delay line 612 via a plurality of buffer circuits 610, as shown in FIG. 2. The number of the column signal lines 684 and the number of the buffer circuits 610 are equal to the number of the input taps of the analog delay line 612, and are 4 or 8, for example.

The buffer circuit 610 is an embodiment of the buffer amplifying circuit of the present invention. It is also an embodiment of the buffer amplifying means of the present invention. The analog delay line 612 is an embodiment of the signal delay circuit of the present invention. It is also an embodiment of the signal delay means of the present invention.

Figure 5:
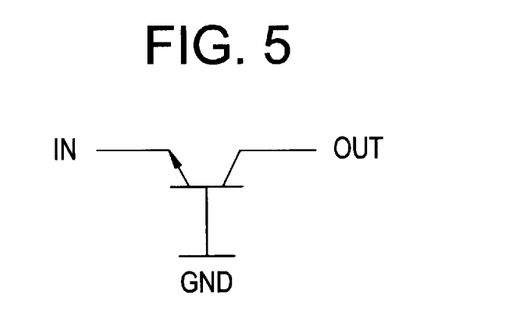
FIG. 5 is a circuit diagram of a buffer circuit.

FIG. 5 shows a circuit diagram of the buffer circuit 610. As shown, the buffer circuit 610 is a grounded-base type transistor circuit. By inputting a current into the emitter, a current equal to the input current can be output from the collector.

Such buffer circuits 610 can prevent the matrix switch 608 and the analog delay line 612 from being affected by each other's internal impedance.

Figure 6:
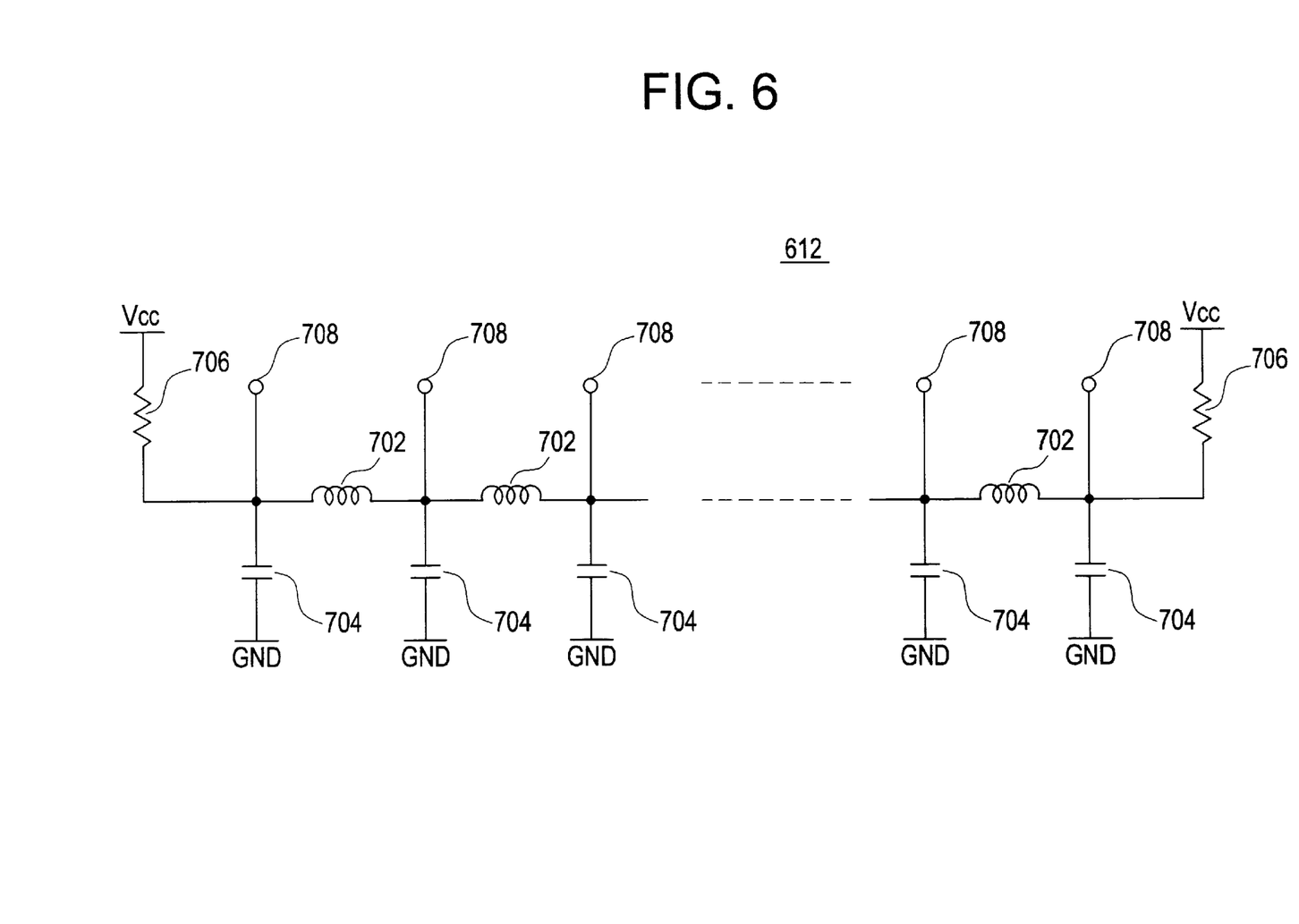
FIG. 6 is a conceptual diagram of an analog delay line.

FIG. 6 shows a conceptual diagram of the analog delay line 612. As shown, the analog delay line 612 is constructed using an LC circuit. The LC circuit consists of a series circuit of a plurality of inductors 702, and a plurality of capacitors 704 connecting the ends of the series circuit and the series connection points between the inductors to ground. The LC circuit is an embodiment of the signal delay line of the present invention.

Matching resistors 706 are connected to both ends of the LC circuit. The other end of each matching resistor 706 is given a pull-up voltage Vcc. The matching resistor 706 is an embodiment of the matching resistor of the present invention.

Taps 708 are drawn out from the ends of the inductor series circuit and the series connection points between the inductors. The taps 708 serve as the input taps of the analog delay line 612. The tap at one of the ends serves as the output tap. A signal input to the tap at the opposite end from the output tap is given the maximum delay. Other signals input to the taps other than that tap are given respective delays corresponding to the distance from the output tap. The input tap is an embodiment of the signal input tap of the present invention. The output tap is an embodiment of the signal output tap of the present invention.

The maximum delay of the analog delay line 612 is $\lambda/2$. In other words, the maximum delay of the analog delay line 612 is allowed to be half of that in conventional analog delay lines because input signals delayed by $\lambda/2$ can be selected by the selecting circuits 604, as described earlier, and hence the analog delay line is only required to give a delay of no more than $\lambda/2$.

Strictly speaking, the maximum delay is somewhat less than $\lambda/2$. If the tap-to-tap delay is $\lambda/8$ and the number of the input taps is 4, the maximum delay is $3\lambda/8$; and if the tap-to-tap delay is $\lambda/16$ and the number of the input taps is 8, the maximum delay is $7\lambda/16$.

Since the maximum delay is thus halved as compared to the conventional one, the number of taps in the analog delay line 612 is reduced by half with the same tap-to-tap delay. For example, if the tap-to-tap delay is $\lambda/8$, the number of taps is reduced to 4, which is half of 8 in the prior art; similarly, if the tap-to-tap delay is $\lambda/16$ the number of taps is reduced to 8, which is half of 16 in the prior art.

Since the number of taps of the analog delay line 612 is thus reduced by half, the number of the output signal lines in the matrix switch 608 is reduced by half, and hence the number of switches connecting the input signal lines to the output signal lines is also reduced by half. In other words, the matrix switch 608 works satisfactorily with a number of switches halved as compared to the conventional one.

Figure 7:
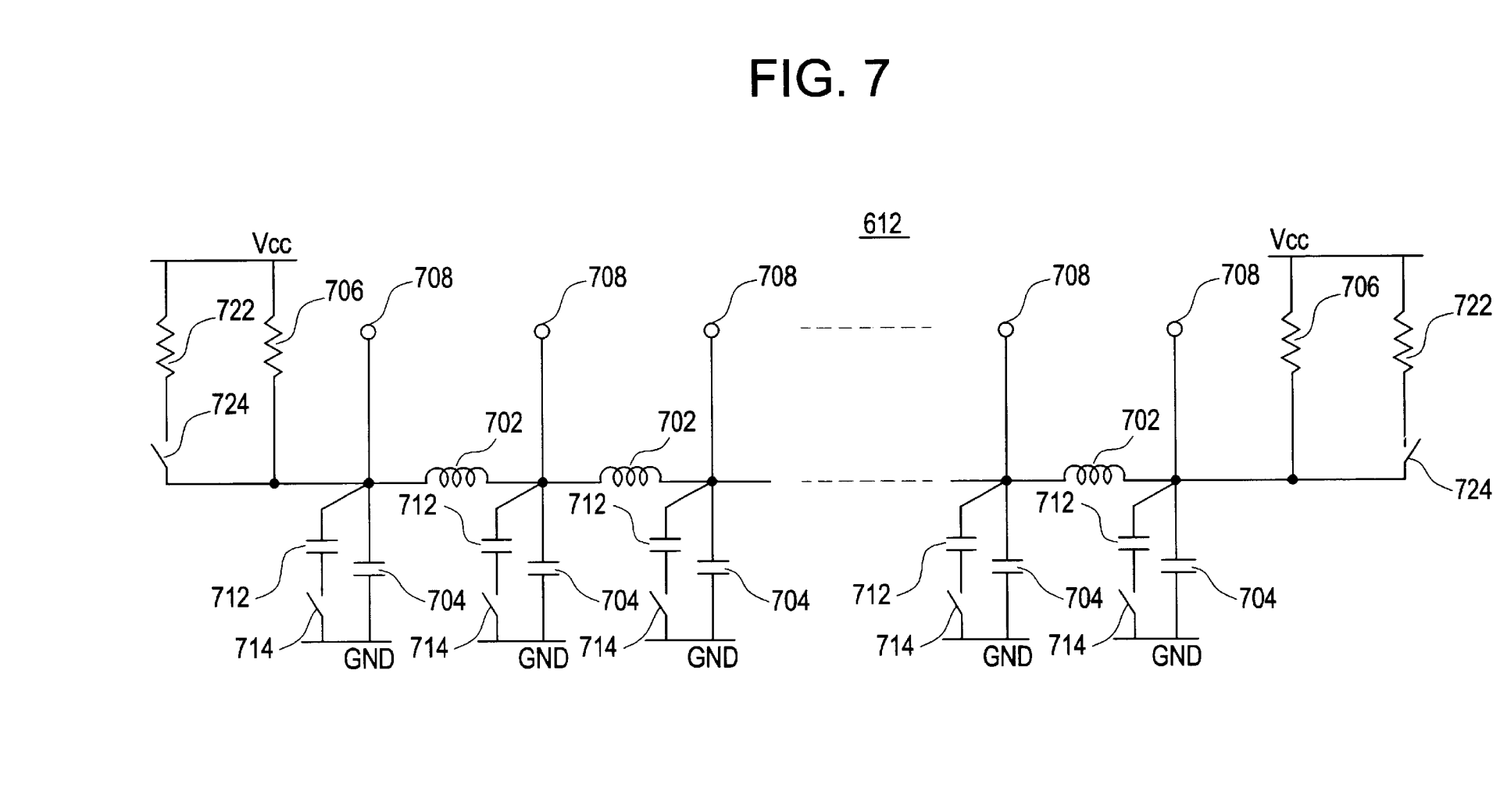
FIG. 7 is a conceptual diagram of the analog delay line.

The analog delay line 612 may have a configuration as shown in FIG. 7, in which a series circuit of a capacitor 712 and a switch 714 is connected in parallel to each capacitor 704, and a series circuit of a resistor 722 and a switch 724 is connected in parallel to each matching resistor 706. Opening/closing of the switches 714 and 724 is controlled by the control section 14 that will be described later.

A portion including the analog delay line 612 and the control section 14 is an embodiment of the signal processing circuit of the present invention. The configuration of the portion including the analog delay line 612 and the control section 14 represents an embodiment of the circuit in accordance with the present invention.

The series circuit of the capacitor 712 and the switch 714 is an embodiment of the series circuit of a capacitor and a switch of the present invention. The series circuit of the resistor 722 and the switch 724 is an embodiment of the series circuit of a switch and a resistor of the present invention.

Thus, the analog delay line 612 can be adapted to accommodate two kinds of input signals having different frequencies. Specifically, if the analog delay line 612 is adapted to accommodate an input signal having a frequency of 3.5 MHz, for example, with all the switches 714 and 724 opened, it can be adapted to accommodate an input signal having a frequency of 2 MHz, for example, by closing all the switches 714 and 724 to connect the capacitors 712 to the capacitors 704 in parallel and connect the matching resistors 722 to the matching resistors 706 in parallel. To further increase the number of accommodated frequencies, the number of series circuits of the capacitor and switch and the number of series circuits of the resistor and switch may be increased similarly to the above.

It will be easily recognized that the switching between the accommodated frequencies may be achieved by changing the inductors, instead of changing the capacitors. Moreover, a plurality of analog delay lines 612 having different accommodated frequencies may be provided to switch these analog delay lines 612 depending upon the frequency of the input signal.

The receiver section 6 of such a configuration is connected to a Doppler processing section 8. The received echo signal subjected to the phased addition at the receiver section 6 is input to the Doppler processing section 8. The Doppler processing section 8 generates Doppler image data based upon the received echo signal. The Doppler processing section 8 also outputs an acoustic signal. The acoustic signal is sometimes referred to as a Doppler sound. The Doppler processing section 8 is an embodiment of the Doppler processing means of the present invention.

Figure 8:
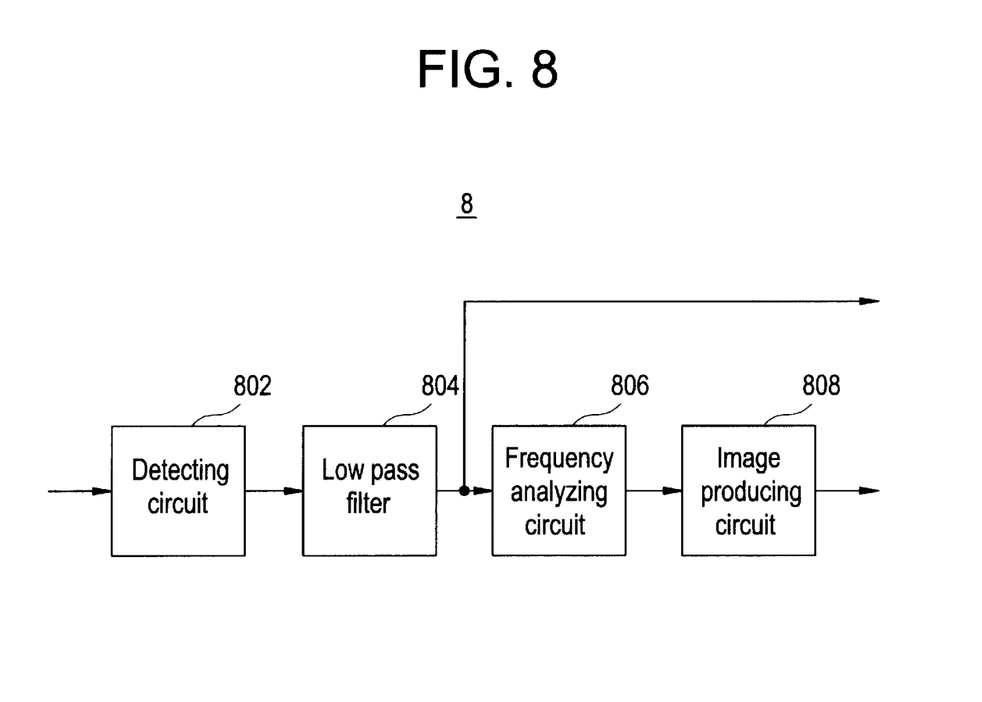
FIG. 8 is a block diagram of a Doppler processing section.

FIG. 8 shows a block diagram of the Doppler processing section 8. As shown, the Doppler processing section 8 has a detecting circuit 802 that detects the received echo signal. The detected signal is low-pass filtered by a low pass filter 804. A Doppler signal is extracted by the detection and the low-pass filtering.

The Doppler signal is input to a frequency analyzing circuit 806, and also to a sound output section 12 that will be described below. The frequency analyzing circuit 806 performs frequency analysis on the Doppler signal. The result of the frequency analysis is input to an image production circuit 808. The image production circuit 808 produces a frequency spectral image of the Doppler signal.

The Doppler processing section 8 is connected with a display section 10 and the sound output section 12. The display section 10 displays the spectral image supplied from the Doppler processing section 8. The sound output section 12 outputs the Doppler signal as a sound. The display section 10 and the sound output section 12 are embodiments of the display means of the present invention.

The transmitter section 4, receiver section 6, Doppler processing section 8 and display section 10 are connected with the control section 14. The control section 14 supplies control signals to these sections to control their operation. The control section 14 is an embodiment of the control means of the present invention. It is also an embodiment of the control circuit of the present invention.

In the transmitter section 4, the transmission frequency is controlled. In the receiver section 6, the phased addition, or the selecting circuit 604 and the matrix switch 608, is controlled. Moreover, the switches 714 and 724 in the analog delay line 612 are controlled with the frequency change.

While the present invention has been described with reference to a case in which the phased addition of the ultrasonic echoes is performed by the signal processing circuit in accordance with the present invention, it will be easily recognized that the signal processing circuit of the present invention can perform the phased addition on other types of continuous wave echoes, for example, echoes of electromagnetic wave, as well as the ultrasonic echoes.

While the present invention has been described with reference to exemplary embodiments hereinabove, various changes or substitutions may be made on these embodiments by those ordinarily skilled in the art pertinent to the present invention without departing from the technical scope of the present invention. Therefore, the technical scope of the present invention encompasses not only those embodiments described above but all the embodiments that fall within the scope of the appended claims.

Many widely different embodiments of the invention may be configured without departing from the spirit and the scope of the present invention. It should be understood that the present invention is not limited to the specific embodiments described in the specification, except as defined in the appended claims.

What is claimed is:

1. A signal processing circuit comprising:
    a plurality of amplifying circuits for respectively amplifying a plurality of continuous wave input signals, and outputting each respective pair of amplified signals that have mutually opposite phases for each continuous wave input signal;
    a plurality of selecting circuits, each of which selects one signal of said pair of amplified signals from each of said plurality of amplifying circuits; and
    a matrix switch having a plurality of mutually crossing signal input paths and signal output paths, and switches provided one at every intersection of said signal input paths and signal output paths, in which the output signals from said plurality of selecting circuits are led respectively to said plurality of signal input paths.

2. The signal processing circuit as defined in claim 1, comprising:
    voltage/current transforming circuits provided between said plurality of amplifying circuits and said plurality of selecting circuits, one voltage/current transforming circuit being provided for each of the output paths for each pair of amplified signals from said plurality of amplifying circuits.

3. The signal processing circuit as defined in claim 2, wherein said voltage/current transforming circuit is a resistor.

4. The signal processing circuit as defined in claim 1, comprising:
    voltage/current transforming circuits provided between said plurality of selecting circuits and said matrix switch, one voltage/current transforming circuit being provided for each of said plurality of selecting circuits.

5. The signal processing circuit as defined in claim 1, comprising:

a control section for controlling said selecting circuits and said switches in said matrix switch.

6. The signal processing circuit as defined in claim 1, comprising:

a signal delay circuit having a plurality of signal input taps drawn out from different positions along a signal delay line and a signal output tap drawn out from at least one end of said signal delay line, in which the signals from said plurality of signal output paths of said matrix switch are led respectively to said plurality of signal input taps.

7. The signal processing circuits as defined in claim 6, wherein said signal delay circuit has at least two switchable delay characteristics.

8. The signal processing circuit as defined in claim 7, wherein said signal delay circuit comprises:

matching resistors connected respectively to both ends of said signal delay line;

a series circuit of a switch and a resistor connected in parallel to each of said matching resistors; and a series circuit of a capacitor and a switch provided between each end of said signal delay line and ground and between each of the drawn-out positions of said plurality of signal input taps and ground.

9. The signal processing circuit as defined in claim 8, comprising:

a control circuit for controlling said switches.

10. The signal processing circuit as defined in claim 6, comprising:

buffer amplifying circuits provided between said matrix switch and said signal delay circuit, one buffer amplifying circuit being provided for each of said plurality of signal output paths.

11. The signal processing circuit as defined in claim 10, wherein said buffer amplifying circuit is a grounded-base type transistor circuit.

12. A signal processing circuit in accordance with claim 1 further comprising:

a signal delay line;

signal input taps drawn from said signal delay line, wherein said signal input taps are configured to receive output signals of said matrix switch;

a first resistor coupled to at least one end of said signal delay line; and a first capacitor coupled between each signal input tap and a ground.

13. A signal processing circuit in accordance with claim 12 further comprising:

a second capacitor and a switch coupled in parallel to said first capacitor; and a second resistor and a switch coupled in parallel to said first resistor.

14. A signal processing circuit comprising:

a signal delay line;

matching resistors connected respectively to both ends of said signal delay line;

a plurality of signal input taps drawn out from different positions along said signal delay line;

a signal output tap drawn out from at least one end of said signal delay line;

a series circuit of a switch and a resistor connected in parallel to each of said matching resistors; and a series circuit of a capacitor and a switch provided between each end of said signal delay line and ground and between each of the drawn out positions of said plurality of signal input taps and ground.

15. The signal processing circuit as defined in claim 14, comprising:

a control circuit for controlling said switches.

16. An ultrasound Doppler apparatus comprising:

ultrasound transmitting/receiving means for transmitting continuous wave ultrasound and receiving echoes of said continuous wave ultrasound by a plurality of ultrasonic transducers;

a plurality of amplifying means for respectively amplifying a plurality of continuous wave input signals led from said plurality of ultrasonic transducers, and outputting each respective pair of amplified signals that have mutually opposite phases for each continuous wave input signal;

a plurality of selecting means, each of which selects one signal of said pair of amplified signals from each of said plurality of amplifying means;

signal path arranging means having a plurality of mutually crossing signal input paths and signal output paths, and switches provided one at every intersection of said signal input paths and signal output paths, in which the output signals from said plurality of selecting means are led respectively to said plurality of signal input paths;

signal delay means having a plurality of signal input taps drawn out from different positions along a signal delay line and a signal output tap drawn out from at least one end of said signal delay line, in which the signals from said plurality of signal output paths of said signal path arranging means are lead respectively to said plurality of signal input taps;

control means for controlling said selecting means and said switches in said signal path arranging means;

Doppler processing means for calculating a Doppler shift of said echoes based on the signal led from said signal output tap of said signal delay means; and display means for displaying said calculated Doppler shift.

17. The ultrasound Doppler apparatus as defined in claim 16, comprising:

voltage/current transforming means provided between said plurality of amplifying means and said plurality of selecting means, one voltage/current transforming means being provided for each of the output paths for each pair of amplified signals from said plurality of amplifying means.

18. The ultrasound Doppler apparatus as defined in claim 17, wherein said voltage/current transforming means is a resistor.

19. The ultrasound Doppler apparatus as defined in claim 16, comprising:

voltage/current transforming means provided between said plurality of selecting means and said signal path arranging means, one voltage/current transforming means being provided for each of said plurality of selecting means.

20. The ultrasound Doppler apparatus as defined in claim 16, comprising:

buffer amplifying means provided between said signal path arranging means and said signal delay means, one buffer amplifying means being provided for each of said plurality of signal output paths.

21. The ultrasound Doppler apparatus as defined in claim 20, wherein said buffer amplifying means is a grounded-base type transistor circuit.

22. The ultrasound Doppler apparatus as defined in any one of claim 16, wherein said signal path arranging means is a matrix switch.

23. The ultrasound Doppler apparatus as defined in claim 16, wherein said signal delay means has at least two switchable delay characteristics.

24. The ultrasound Doppler apparatus as defined in claim 23, wherein said signal delay means comprises:

matching resistors connected respectively to both ends of said signal delay line;

a series circuit of a switch and a resistor connected in parallel to each of said matching resistors;

a series circuit of a capacitor and a switch provided between each end of said signal delay line and ground and between each of the drawn-out positions of said plurality of signal input taps and ground; and control means for controlling said switches.

25. An ultrasound Doppler apparatus in accordance with claim 16 further comprising:

a first resistor coupled to said end of said signal delay line; and a first capacitor coupled between each signal input tap and a ground.

26. An ultrasound Doppler apparatus in accordance with claim 25 further comprising:

a second capacitor and a switch coupled in parallel to said first capacitor; and a second resistor and a switch coupled in parallel to said first resistor.

27. A method for processing a signal comprising:

receiving, by a plurality of ultrasonic transducers, echoes of continuous wave ultrasound;

amplifying a plurality of continuous wave input signals led from the plurality of ultrasonic transducers and outputting pairs of amplified signals, wherein each pair has mutually opposite phases for each continuous wave input signal;

selecting one signal from each pair of amplified signals to output a selected signal; and coupling the selected signal to an input tap along a signal delay line.

28. A method in accordance with claim 27 further comprising transforming the amplified signals from voltage signals to current signals.

29. A method in accordance with claim 27 further comprising transforming the selected signal from a voltage signal to a current signal.

30. A method in accordance with claim 27 further comprising:

coupling a first resistor to at least one end of the signal delay line; and coupling a first capacitor between the input tap and a ground.

31. A method in accordance with claim 30 further comprising:

coupling a second resistor and a switch in parallel to the first resistor; and coupling a second capacitor and a switch in parallel to the first capacitor.

* * * * *